(12) United States Patent
Kwag et al.

(10) Patent No.: US 11,394,910 B2
(45) Date of Patent: Jul. 19, 2022

(54) IMAGE SENSING DEVICE GENERATING PIXEL SIGNAL WITH BOOST VOLTAGE AND OPERATING METHOD THEREOF

(71) Applicant: SK hynix Inc., Gyeonggi-do (KR)

(72) Inventors: Pyong-Su Kwag, Gyeonggi-do (KR);
Sung-Kun Park, Gyeonggi-do (KR);
Dong-Hyun Woo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 136 days.

(21) Appl. No.: 16/293,395

(22) Filed: Mar. 5, 2019

(65) Prior Publication Data

US 2019/0199951 A1    Jun. 27, 2019

Related U.S. Application Data

(63) Continuation-in-part of application No. 15/154,799, filed on May 13, 2016, now abandoned.

(30) Foreign Application Priority Data

Jan. 19, 2016    (KR) .......................... 10-2016-0006417

(51) Int. Cl.
*H04N 5/369*      (2011.01)
*H04N 5/351*      (2011.01)
(Continued)

(52) U.S. Cl.
CPC .......... *H04N 5/3698* (2013.01); *H04N 5/351* (2013.01); *H04N 5/3597* (2013.01); *H04N 5/3745* (2013.01)

(58) Field of Classification Search
CPC .. H04N 5/3698; H04N 5/3597; H04N 5/3745; H04N 5/23245; H04N 5/3765;
(Continued)

(56) References Cited

U.S. PATENT DOCUMENTS 7,224,389 B2 *   5/2007   Dierickx ............ H04N 5/37452
                                                    348/E3.018
8,294,077 B2 *  10/2012   Mao .................... H04N 5/37452
                                                    250/208.1
(Continued)

FOREIGN PATENT DOCUMENTS

KR    10-2015-0101646        9/2015

*Primary Examiner* — Timothy J Henn
*Assistant Examiner* — Akshay Trehan
(74) *Attorney, Agent, or Firm* — IP & T Group LLP

(57) ABSTRACT

An image sensing device includes a floating diffusion node, a reset circuit coupled between a supply terminal of a high voltage and the floating diffusion node, and suitable for resetting the floating diffusion node with the high voltage during a reference period based on a reset control signal, a photodiode coupled between a supply terminal of a low voltage and a coupling node, and suitable for generating a photocharge based on incident light during an exposure period, a transmission block coupled between the coupling node and the floating diffusion node, and suitable for transmitting the photocharge to the floating diffusion node during a transmission period based on a transmission control signal, and a selection circuit coupled between an input terminal of a boost control signal and an output terminal of a pixel signal, and suitable for generating the pixel signal with a boost voltage greater than the high voltage during the transmission period based on a selection control signal and a voltage applied to the floating diffusion node.

15 Claims, 3 Drawing Sheets

(51) Int. Cl.
*H04N 5/359* (2011.01)
*H04N 5/3745* (2011.01)

(58) Field of Classification Search
CPC ........ H04N 5/235; H04N 5/247; H04N 5/335;
H04N 5/357; H04N 5/369–378; H04N
5/351–3559; H04N 5/374–37457; H01L
27/146; H01L 27/14609; H01L 27/14643
See application file for complete search history.

(56) References Cited

U.S. PATENT DOCUMENTS

| | | | | |
|---|---|---|---|---|
| 9,491,386 | B2* | 11/2016 | Chen | H04N 5/3741 |
| 2007/0147132 | A1* | 6/2007 | Lee | H04N 5/3745 |
| | | | | 365/185.23 |
| 2009/0272879 | A1* | 11/2009 | Dai | H04N 5/37452 |
| | | | | 250/208.1 |
| 2010/0231574 | A1* | 9/2010 | Wakabayashi | H04N 5/376 |
| | | | | 345/211 |
| 2010/0271517 | A1* | 10/2010 | De Wit | H04N 5/378 |
| | | | | 348/294 |
| 2011/0036969 | A1* | 2/2011 | Ahn | H01L 27/14609 |
| | | | | 250/208.1 |
| 2012/0153123 | A1* | 6/2012 | Mao | H04N 5/3559 |
| | | | | 250/208.1 |
| 2013/0048831 | A1* | 2/2013 | Bikumandla | H04N 5/3559 |
| | | | | 250/208.1 |
| 2017/0147132 | A1 | 5/2017 | Choi | |
| 2019/0252448 | A1* | 8/2019 | Hanzawa | H04N 5/379 |

* cited by examiner

ND OPERATING METHOD THEREOF

IMAGE SENSING DEVICE GENERATING PIXEL SIGNAL WITH BOOST VOLTAGE AND OPERATING METHOD THEREOF

CROSS-REFERENCE TO RELATED APPLICATIONS

The present application is a continuation of, and claims priority under 35. U.S.C. § 120 on, U.S. patent application Ser. No. 15/154,799, filed on May 13, 2016, which claims priority under 35 U.S.C. § 119(a) to Korean Patent Application No. 10-2016-0006417, filed on Jan. 19, 2016, which are incorporated herein by reference in their entirety.

BACKGROUND

1. Field

Various embodiments of the present invention generally relate to a semiconductor design technique. Particularly, embodiments relate to an image sensing device and an operating method thereof.

2. Description of the Related Art

Image sensing devices capture images using photosensitive properties of semiconductors. Image sensing devices may be classified into charge-coupled device (CCD) image sensors and complementary metal-oxide semiconductor (CMOS) image sensors. CMOS image sensors allow both analog and digital control circuits to be directly realized on a single integrated circuit (IC), making CMOS image sensors the most widely used type of image sensor.

SUMMARY

Various embodiments of the present invention are directed to an image sensing device for increasing the amount of current flowing through an output stage of a pixel, and an operating method of the image sensing device.

Also, various embodiments of the present invention are directed to an image sensing device having an improved transmission capability for transmitting a photocharge generated from a photodiode to a floating diffusion node while increasing the amount of current flowing through an output stage of a pixel, and an operating method of the image sensing device.

In accordance with an embodiment of the present invention, an image sensing device includes: a floating diffusion node; a reset circuit coupled between a supply terminal of a high voltage and the floating diffusion node, and suitable for resetting the floating diffusion node with the high voltage during a reference period based on a reset control signal; a photodiode coupled between a supply terminal of a low voltage and a coupling node, and suitable for generating a photocharge based on incident light during an exposure period; a transmission block coupled between the coupling node and the floating diffusion node, and suitable for transmitting the photocharge to the floating diffusion node during a transmission period based on a transmission control signal; and a selection circuit coupled between an input terminal of a boost control signal and an output terminal of a pixel signal, and suitable for generating the pixel signal with a boost voltage greater than the high voltage during the transmission period based on a selection control signal and a voltage applied to the floating diffusion node.

The image sensing device may further include a first accumulation circuit coupled between the input terminal of the boost control signal and the floating diffusion node.

The first accumulation circuit may include a parallel-plate capacitor.

The selection circuit may include: a driver coupled between an output node and the input terminal of the boost control signal, and suitable for driving the output node to the boost voltage based on the voltage applied to the floating diffusion node; and an output circuit coupled between the output node and the output terminal of the pixel signal, and suitable for outputting the pixel signal based on the selection control signal.

The selection circuit may generate the pixel signal with the high voltage during the reference period.

The selection circuit may include: a driver coupled between an output node and the input terminal of the boost control signal, and suitable for driving the output node to the high voltage during the reference period and driving the output node to the boost voltage during the transmission period, based on the voltage applied to the floating diffusion node; and an output circuit coupled between the output node and the output terminal of the pixel signal, and suitable for outputting the pixel signal based on the selection control signal.

The image sensing device may further include a second accumulation circuit coupled between the floating diffusion node and the supply terminal of the low voltage.

The second accumulation circuit may include a junction capacitor.

The reset circuit may reset the floating diffusion node to the high voltage during a pixel reset period before the reference period based on the reset control signal, and the transmission block may reset the photodiode to the high voltage during the pixel reset period based on the transmission control signal.

In accordance with an embodiment of the present invention, an operating method of an image sensing device includes: resetting a floating diffusion node to a high voltage; generating a pixel signal with the high voltage based on a voltage applied to the floating diffusion node, during a reference period; transmitting a photocharge generated from a photodiode to the floating diffusion node; and generating the pixel signal with a boost voltage greater than the high voltage based on the voltage applied to the floating diffusion node, during a transmission period after the reference period.

The generating of the pixel signal with the boost voltage may include: driving an output node to the boost voltage based on the voltage applied to the floating diffusion node during the transmission period; and outputting a data signal corresponding to the voltage applied to the floating diffusion node as the pixel signal during the transmission period.

The generating of the pixel signal with the high voltage may include: driving an output node to the high voltage based on the voltage applied to the floating diffusion node during the reference period; and outputting a reference signal corresponding to the voltage applied to the floating diffusion node as the pixel signal during the reference period.

In accordance with an embodiment of the present invention, an operating method of an image sensing device includes: resetting a floating diffusion node to a high voltage; boosting the floating diffusion node with a boost voltage greater than the high voltage based on a capacitive coupling effect; generating a pixel signal with the boost voltage based on a voltage applied to the floating diffusion node, during a reference period; transmitting a photocharge generated from a photodiode to the floating diffusion node; and generating the pixel signal with the boost voltage based on the voltage applied to the floating diffusion node, during a transmission period after the reference period.

The generating of the pixel signal during the transmission period may include: driving an output node to the boost voltage based on the voltage applied to the floating diffusion node during the transmission period; and outputting a data signal corresponding to the voltage applied to the floating diffusion node as the pixel signal during the transmission period.

The generating of the pixel signal during the reference period may include: driving an output node with the boost voltage based on the voltage applied to the floating diffusion node during the reference period; and outputting a reference signal corresponding to the voltage applied to the floating diffusion node as the pixel signal during the reference period

DETAILED DESCRIPTION

Various embodiments of the present invention are described below in more detail with reference to the accompanying drawings. These embodiments are provided so that this disclosure is thorough and complete and fully conveys the scope of the present invention to those skilled in the art.

The terminology used herein is for the purpose of describing particular embodiments only and is not intended to be limiting of the inventive concept. As used herein, "connected/coupled" refers to one component not only directly coupling another component but also indirectly coupling another component through one or more intermediate components. Communication between two elements, whether direct or indirectly connected/coupled, may be wired or wireless, unless the context indicates otherwise. It is also noted that the terms "comprises," "comprising," "includes," and/or "including" when used in this specification, indicate the presence of stated features, but do not preclude the presence or addition of one or more other features. It will be further understood that singular forms are intended to include the plural forms as well, unless the context clearly indicates otherwise. Also, throughout the specification, reference to "an embodiment," "another embodiment" or the like is not necessarily to only one embodiment, and different references to any such phrase are not necessarily to the same embodiment(s).

Figure 1:
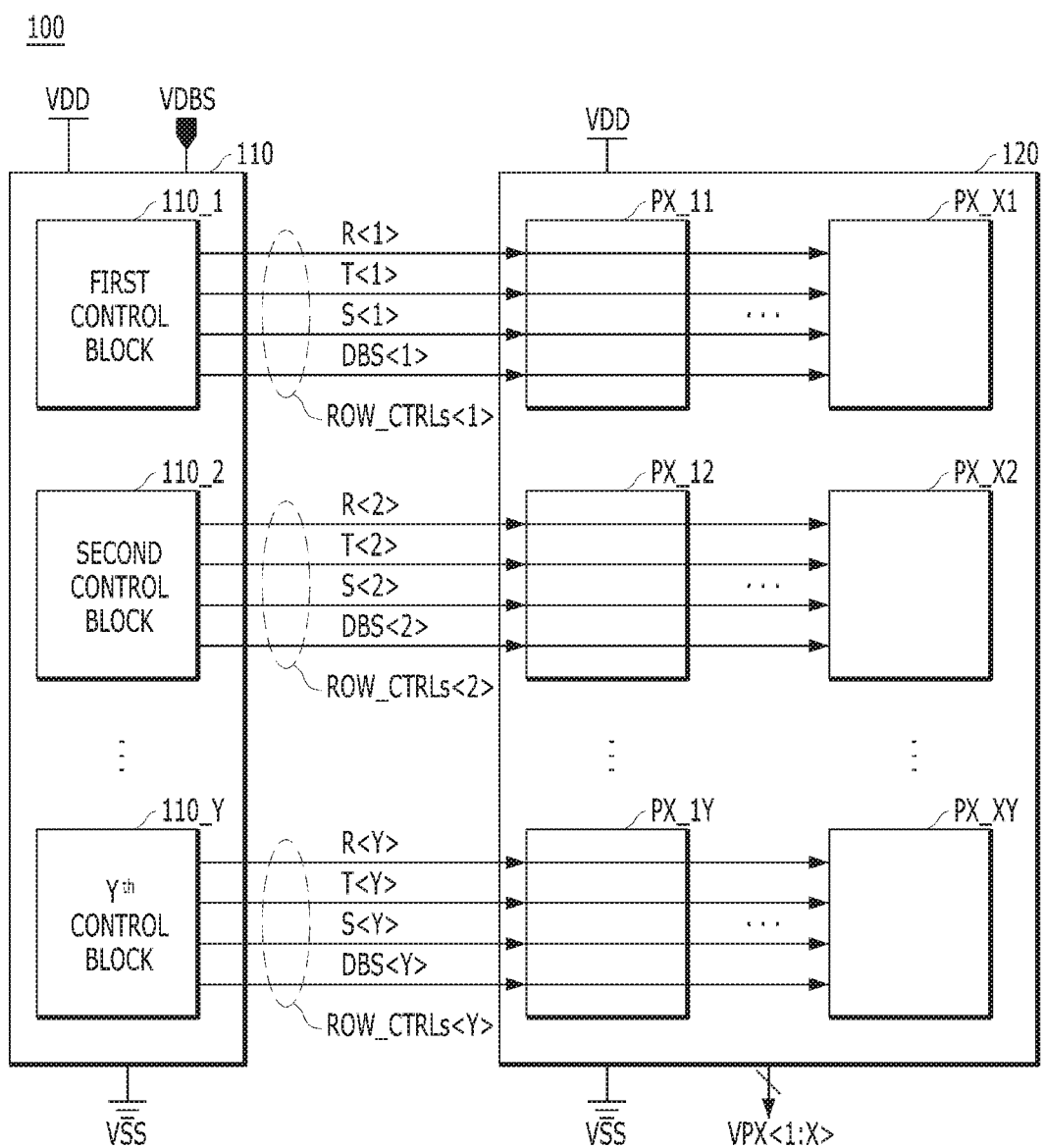
FIG. 1 is a block diagram illustrating an image sensing device in accordance with an embodiment.

FIG. 1 is a block diagram illustrating an image sensing device 100 in accordance with an embodiment.

Referring to FIG. 1, the image sensing device 100 may include a row controller 110 and a pixel array 120.

The row controller 110 may generate first to $Y^{th}$ row control signals ROW_CTRLs<1:Y> for controlling an operation of the pixel array 120 on a row basis, where Y is a natural number. For example, the row controller 110 may include first to $Y^{th}$ control blocks 110_1 to 110_Y for generating the first to $Y^{th}$ row control signals ROW_CTRLs<1:Y>, respectively. Each of the first to $Y^{th}$ row control signals ROW_CTRLs<1:Y> may include a reset control signal R<#>, a transmission control signal T<#>, a selection control signal S<#>, and a boost control signal DBS<#>. For example, the first row control signal ROW_CTRLs<1> may include a first reset control signal R<1>, a first transmission control signal T<1>, a first selection control signal S<1>, and a first boost control signal DBS<1>. The second row control signal ROW_CTRLs<2> may include a second reset control signal R<2>, a second transmission control signal T<2>, a second selection control signal S<2>, and a second boost control signal DBS<2>. The $Y^{th}$ row control signal ROW_CTRLs<Y> may include a $Y^{th}$ reset control signal R<Y>, a $Y^{th}$ transmission control signal T<Y>, a $Y^{th}$ selection control signal S<Y>, and a $Y^{th}$ boost control signal DBS<Y>.

The first to $Y^{th}$ control blocks 110_1 to 110_Y may generate the first to $Y^{th}$ reset control signals R<1:Y>, the first to $Y^{th}$ transmission control signals T<1:Y>, and the first to $Y^{th}$ selection control signals S<1:Y>, which pulse within a first voltage range. Further, the first to $Y^{th}$ control blocks 110_1 to 110_Y may generate the first to $Y^{th}$ boost control signals DBS<1:Y> which pulse within a second voltage range. The first voltage range may be between a low voltage VSS and a high voltage VDD. The second voltage range may be between the high voltage VDD and a boost voltage VDBS. For example, the low voltage VSS may include a ground voltage, the high voltage VDD may include a power source voltage, and the boost voltage VDBS may include a voltage higher than the high voltage VDD.

The pixel array 120 may include a plurality of pixels PX_11 to PX_XY arranged in rows and columns. The pixels PX_11 to PX_XY may generate first to $X^{th}$ pixel signals VPX<1:X> on a row basis, based on the first to $Y^{th}$ row control signals ROW_CTRLs<1:Y>, respectively. For example, the pixels PX_11 to PX_X1 arranged in a first row may simultaneously generate the first to $X^{th}$ pixel signals VPX<1:X> during a first row time period based on the first row control signal ROW_CTRL<1>. The pixels PX_1Y to PX_XY arranged in the last row (i.e., $Y^{th}$ row) may simultaneously generate the first to $X^{th}$ pixel signals VPX<1:X> during a $Y^{th}$ row time period based on the $Y^{th}$ row control signal ROW_CTRL<Y>.

Figure 2:
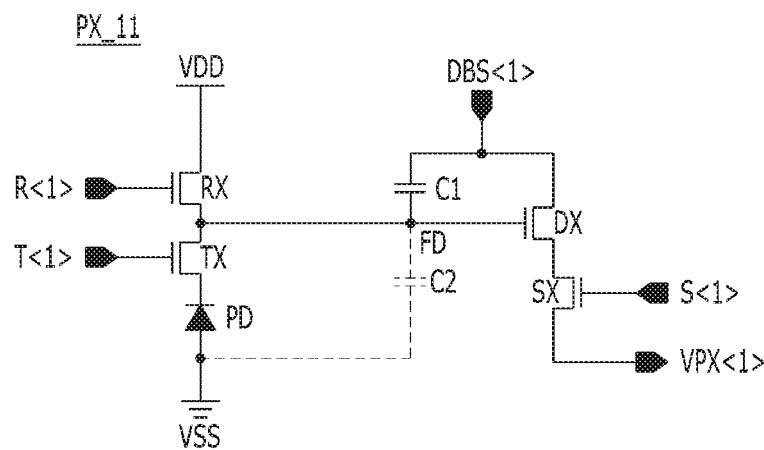
FIG. 2 is a diagram illustrating an internal configuration of a pixel in accordance with an embodiment.

FIG. 2 is a circuit diagram illustrating an internal configuration of a pixel e.g., one of the pixels PX_11 to PX_XY shown in FIG. 1, in accordance with an embodiment. Since the pixels PX_11 to PX_XY have the same structure, the pixel PX_11 arranged at a cross point of the first row and a first column will be representatively described below.

Referring to FIG. 2, the pixel PX_11 may include a photodiode PD, a transmission block or circuit TX, a reset block or circuit RX, a first accumulation block or circuit C1, a second accumulation block or circuit C2, and a selection block or circuit with components or circuits DX and SX. The components or circuits DX and SX are implemented by using transistors as shown in FIG. 2.

Figure 3:
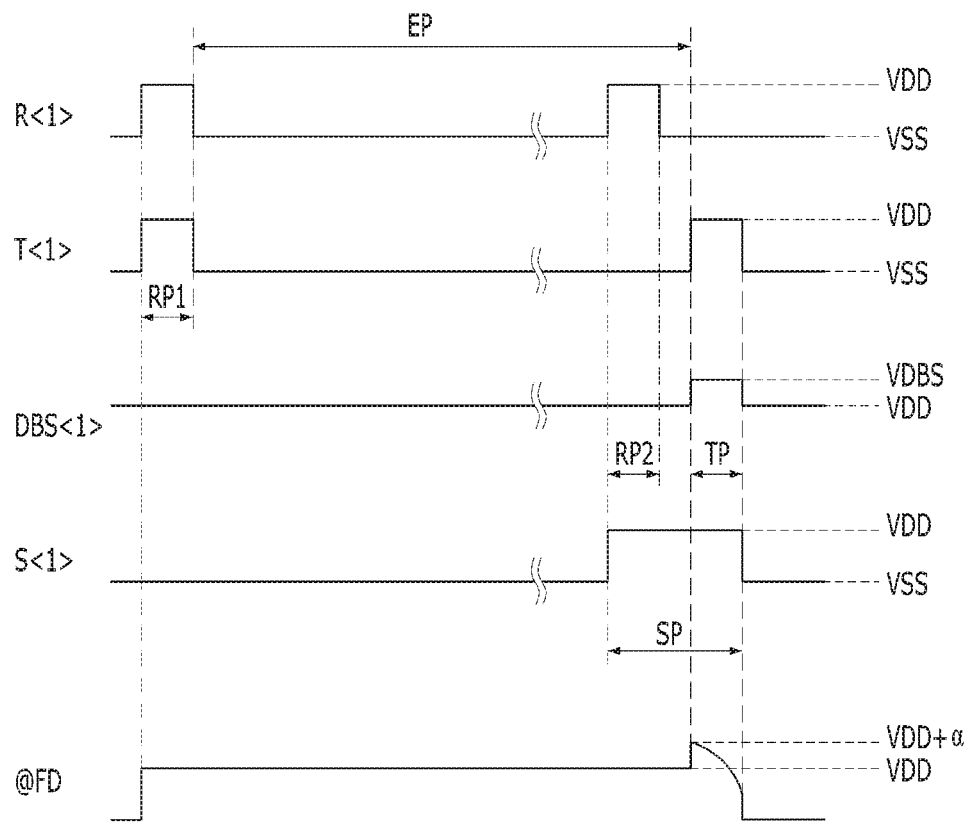
FIG. 3 is a timing diagram for describing an operation of an image sensing device in accordance with an embodiment.
Figure 4:
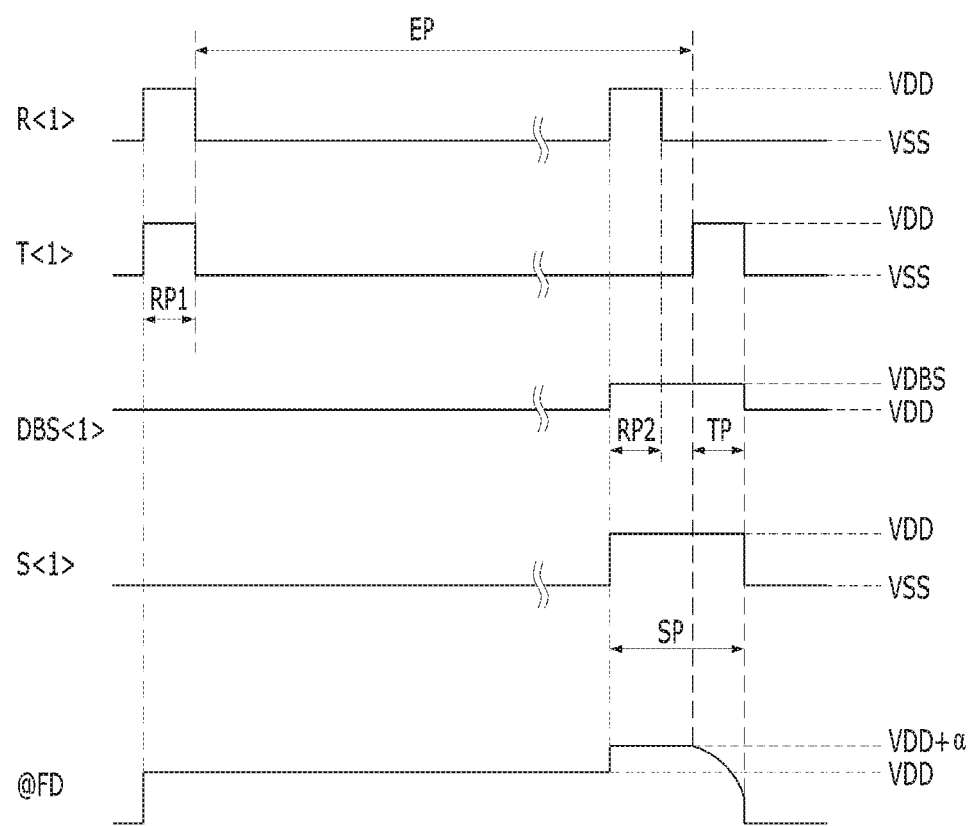
FIG. 4 is a timing diagram for describing an operation of an image sensing device in accordance with another embodiment.

The photodiode PD may be coupled between a coupling node and a supply terminal of the low voltage VSS. The photodiode PD may generate a photocharge based on incident light during an exposure period EP. The exposure period EP may range from a time at which a pixel reset period RP1 terminates to a time at which a transmission period TP starts, as shown in FIGS. 3 and 4.

The transmission block TX may be coupled between the coupling node and a floating diffusion node FD. The transmission block TX may transmit the photocharge generated from the photodiode PD to the floating diffusion node FD based on the first transmission control signal T<1>. The transmission block TX may transmit the photocharge to the floating diffusion node FD during the transmission period TP. The transmission period TP may overlap an end portion of a selection period SP. The transmission block TX may reset the photodiode PD based on the first transmission control signal T<1>. The transmission block TX may be enabled along with the reset block or circuit RX during the pixel reset period RP1 to discharge the photocharge remaining in the photodiode PD to a supply terminal of a high voltage VDD. For example, the transmission block TX may include an NMOS transistor having a gate configured to receive the first transmission control signal T<1> and a drain and source coupled between the floating diffusion node FD and the coupling node.

The reset block or circuit RX may be coupled between the supply terminal of the high voltage VDD and the floating diffusion node FD. The reset block RX may reset the floating diffusion node FD to the high voltage VDD based on the first reset control signal R<1>. Specifically, the reset block RX may reset the floating diffusion node FD to the high voltage VDD during the pixel reset period RP1 and a reference period RP2. Thus, the reset block RX may precharge the floating diffusion node FD at a voltage level corresponding to the high voltage VDD simultaneously while discharging charges remaining in the first and second accumulation blocks C1 and C2 to the supply terminal of the high voltage VDD. The reference period RP2 may overlap an initial period of the selection period SP. For example, the reset block RX may include an NMOS transistor having a gate configured to receive the first reset control signal R<1> and a drain and source coupled between the supply terminal of the high voltage VDD and the floating diffusion node FD.

The first accumulation block C1 may be coupled between an input terminal of the first boost control signal DBS<1> and the floating diffusion node FD. The first accumulation block C1 may boost the floating diffusion node FD to the boost voltage VDBS during a boosting period based on the first boost control signal DBS<1>. For example, the first accumulation block C1 may boost the floating diffusion node FD to the boost voltage VDBS corresponding to the first boost control signal DBS<1> based on a capacitive coupling effect. The boosting period may include only the transmission period TP or include the reference period RP2 and the transmission period TP. The first accumulation block C1 may accumulate the photocharge transmitted to the floating diffusion node FD during the transmission period TP. For example, the first accumulation block C1 may include a parallel-plate capacitor.

The second accumulation block C2 may be coupled between the floating diffusion node FD and the supply terminal of the low voltage VSS. The second accumulation block C2 may accumulate the photocharge transmitted to the floating diffusion node FD during the transmission period TP together with the first accumulation block C1. For example, the second accumulation block C2 may include a junction capacitor. The junction capacitor may be a parasitic capacitor.

The selection block components DX and SX may be coupled in series between the input terminal of the first boost control signal DBS<1> and an output terminal of the first pixel signal VPX<1>. The selection block components DX and SX may generate the first pixel signal VPX<1> based on the first selection control signal S<1> and a voltage applied to the floating diffusion node FD.

Particularly, the selection block components DX and SX may generate the first pixel signal VPX<1> based on the high voltage VDD of the first boost control signal DBS<1>. The selection block DX and SX may generate a reference signal as the first pixel signal VPX<1> during the reference period RP2. The selection block DX and SX may generate the first pixel signal VPX<1> based on the boost voltage VDBS of the first boost control signal DBS<1> during the transmission period TP. The selection block components DX and SX may generate a data signal as the first pixel signal VPX<1> during the transmission period TP.

Alternatively, the selection block components DX and SX may generate the first pixel signal VPX<1> based on the boost voltage VDBS of the first boost control signal DBS<1> during the reference period RP2. The selection block components DX and SX may generate a reference signal as the first pixel signal VPX<1> during the reference period RP2. The selection block components DX and SX may generate the first pixel signal VPX<1> based on the boost voltage VDBS of the first boost control signal DBS<1> during the transmission period TP. The selection block components DX and SX may generate a data signal as the first pixel signal VPX<1> during the transmission period TP.

The selection block component DX may include a driver and component SX may include an output circuit. The driver DX may be coupled between the input terminal of the first boost control signal DBS<1> and an output node. The driver DX may drive the output node to the high voltage VDD or boost voltage VDBS of the first boost control signal DBS<1> based on the voltage applied to the floating diffusion node FD. For example, the driver DX may include an NMOS transistor having a gate coupled to the floating diffusion node FD and a drain and source coupled between the input terminal of the first boost control signal DBS<1> and the output node. The output circuit SX may be coupled between the output node and the output terminal of the first pixel signal VPX<1>. The output circuit SX may output the first pixel signal VPX<1> based on the first selection control signal S<1>. For example, the output circuit SX may include an NMOS transistor having a gate configured to receive the first selection control signal S<1> and a drain and source coupled between the output node and the output terminal of the first pixel signal VPX<1>. The functionality of the driver DX and the output circuit SX may be integrated in a single component that forms the selection block.

An operation of the image sensing device 100 having the aforementioned structure is described below. By way of example, an operation corresponding to the pixel PX_11 arranged at the cross point of the first row and the first column is described below.

FIG. 3 is a timing diagram for describing an operation of a pixel, e.g., the pixel PX_11 included in the image sensing device 100 shown in FIG. 1, in accordance with an embodiment.

Referring to FIG. 3, the row controller 110 of FIG. 1 may generate the first row control signal ROW_CTRLs<1> during the first row time period. For example, the first control block 110_1 may activate the first reset control signal R<1> and the first transmission control signal T<1> during the pixel reset period RP1. The first control block 110_1 may also activate the first selection control signal S<1> during the selection period SP after the pixel reset period RP1. In addition, the first control block 110_1 may activate the first reset control signal R<1> during the reference period RP2 of the selection period SP, and activate the first transmission control signal T<1> and the first boost control signal DBS<1> during the transmission period TP of the selection period SP. The reference period RP2 may overlap an initial period of the selection period SP. The transmission period TP may overlap an end portion of the selection period SP.

The pixel PX_11 may generate the first pixel signal VPX<1> based on the first row control signal ROW_CTRL<1>. This process may be described in more detail as follows.

The pixel PX_11 may reset the photodiode PD and the floating diffusion node FD to the high voltage VDD during the pixel reset period RP1 based on the first reset control signal R<1> and the first transmission control signal T<1>. For example, the reset block RX may discharge the charges remaining in the first and second accumulation blocks C1 and C2 to the supply terminal of the high voltage VDD during the pixel reset period RP1 based on the first reset control signal R<1>. At the same time, the transmission block TX may discharge the charge remaining in the photodiode PD to the supply terminal of the high voltage VDD through the reset block RX during the pixel reset period RP1 based on the first transmission control signal T<1>. The voltage applied to the floating diffusion node FD may correspond to the high voltage VDD.

Subsequently, the pixel PX_11 may generate the reference signal as the first pixel signal VPX<1> and then generate the data signal as the first pixel signal VPX<1> during the selection period SP, based on the first selection control signal S<1>, the first reset control signal R<1>, the first transmission control signal T<1> and the first boost control signal DBS<1>.

First, the process of generating the reference signal as the first pixel signal VPX <1> is described below.

The reset block RX may reset the floating diffusion node FD to the high voltage VDD during the reference period RP2 based on the first reset control signal R<1>. The voltage applied to the floating diffusion node FD may correspond to the high voltage VDD.

The selection block DX and SX may generate the first pixel signal VPX <1> corresponding to the reference signal, using the high voltage VDD of the first boost control signal DBS<1> during the reference period RP2 based on the first selection control signal S<1>. For example, the driver DX may drive the output node to the high voltage VDD of the first boost control signal DBS<1> based on the voltage applied to the floating diffusion node FD. The output circuit SX may output the reference signal to the output terminal of the first pixel signal VPX<1> based on the first selection control signal S<1>.

Next, the process of generating the data signal as the first pixel signal VPX <1> is described below.

The transmission block TX may transmit the photocharge generated from the photodiode PD to the floating diffusion node FD during the transmission period TP based on the first transmission control signal T<1>. The first accumulation block C1 may boost the floating diffusion node FD to the boost voltage VDBS of the first boost control signal DBS<1> based on the capacitive coupling effect during the transmission period TP. The voltage applied to the floating diffusion node FD may correspond to a set voltage (VDD+α). The set voltage (VDD+α) may be defined by the following Equation 1.

$$VDD+\alpha = VDD+(VDBS-VDD)*C11/(C11+C22)$$

Herein, "C11" may refer to capacitance of the first accumulation block C1, and "C22" may refer to capacitance of the second accumulation block C2.

The selection block DX and SX may generate the first pixel signal VPX <1> corresponding to the data signal, using the boost voltage VDBS of the first boost control signal DBS<1> during the transmission period TP based on the first selection control signal S<1>. For example, the driver DX may drive the output node to the boost voltage VDBS of the first boost control signal DBS<1> based on the voltage applied to the floating diffusion node FD. The output circuit SX may output the data signal to the output terminal of the first pixel signal VPX<1> based on the first selection control signal S<1>. For reference, the photodiode PD may generate the photocharge during the exposure period EP from a time at which the pixel reset period RP1 terminates to a time at which the transmission period TP starts.

In accordance with the present embodiment, as a source-drain voltage Vds and a gate-source voltage Vgs of the NMOS transistor included in the driver DX are increased by the boost voltage VDBS during the transmission period TP, the amount of current flowing through the driver DX may be also increased.

FIG. 4 is a timing diagram for describing an operation of a pixel, e.g., the pixel PX_11 included in the image sensing device 100 shown in FIG. 1, in accordance with another embodiment.

Referring to FIG. 4, the row controller 110 of FIG. 1 may generate the first row control signal ROW_CTRLs<1> during the first row time period. For example, the first control block 110_1 may activate the first reset control signal R<1> and the first transmission control signal T<1> during the pixel reset period RP1. The first control block 110_1 may also activate the first boost control signal DBS<1> and the first selection control signal S<1> during the selection period SP after the pixel reset period RP1. In addition, the first control block 110_1 may activate the first reset control signal R<1> during the reference period RP2 of the selection period SP, and activate the first transmission control signal T<1> and the first boost control signal DBS<1> during the transmission period TP of the selection period SP. The reference period RP2 may overlap an initial period of the selection period SP, and the transmission period TP may overlap a later portion of the selection period SP.

The pixel PX_11 may generate the first pixel signal VPX<1> based on the first row control signal ROW_CTRL<1>. This process may be described in more detail as follows.

The pixel PX_11 may reset the photodiode PD and the floating diffusion node FD to the high voltage VDD during the pixel reset period RP1 based on the first reset control signal R<1> and the first transmission control signal T<1>. For example, the reset block RX may discharge the charges remaining in the first and second accumulation blocks C1 and C2 to the supply terminal of the high voltage VDD during the pixel reset period RP1 based on the first reset control signal R<1>. At the same time, the transmission block TX may discharge the charge remaining in the photodiode PD to the supply terminal of the high voltage VDD through the reset block RX during the pixel reset period RP1 based on the first transmission control signal T<1>. The voltage applied to the floating diffusion node FD may correspond to the high voltage VDD.

Subsequently, the pixel PX_11 may generate the reference signal as the first pixel signal VPX<1> and then generate the data signal as the first pixel signal VPX<1> during the selection period SP, based on the first selection control signal S<1>, the first reset control signal R<1>, the first transmission control signal T<1> and the first boost control signal DBS<1>.

First, the process of generating the reference signal as the first pixel signal VPX <1> is described below.

The reset block RX may reset the floating diffusion node FD to the high voltage VDD during the reference period RP2 based on the first reset control signal R<1>. The first accumulation block C1 may boost the floating diffusion node FD to the boost voltage VDBS of the first boost control signal DBS<1> based on the capacitive coupling effect during the reference period RP2. The voltage applied to the floating diffusion node FD may correspond to a set voltage (VDD+α). The set voltage (VDD+α) may be defined by the above-described Equation 1.

The selection block DX and SX may generate the first pixel signal VPX <1> corresponding to the reference signal, using the boost voltage VDBS of the first boost control signal DBS<1> during the reference period RP2 based on the first selection control signal S<1>. For example, the driver DX may drive the output node to the boost voltage VDBS of the first boost control signal DBS<1> based on the voltage applied to the floating diffusion node FD. The output circuit SX may output the reference signal to the output terminal of the first pixel signal VPX<1> based on the first selection control signal S<1>.

Next, the process of generating the data signal as the first pixel signal VPX <1> is described below.

The transmission block TX may transmit the photocharge generated from the photodiode PD to the floating diffusion node FD during the transmission period TP based on the first transmission control signal T<1>. Since the floating diffusion node FD is boosted to the boost voltage VDBS which is higher than the high voltage VDD, the drain-source voltage Vds of the NMOS transistor included in the transmission block TX may rise, and the transmission capability of the transmission block TX may be improved during the transmission period TP.

The selection block DX and SX may generate the first pixel signal VPX <1> corresponding to the data signal, using the boost voltage VDBS of the first boost control signal DBS<1> during the transmission period TP based on the first selection control signal S<1>. For example, the driver DX may drive the output node to the boost voltage VDBS of the first boost control signal DBS<1> based on the voltage applied to the floating diffusion node FD. The output circuit SX may output the data signal to the output terminal of the first pixel signal VPX<1> based on the first selection control signal S<1>.

The photodiode PD may generate the photocharge during the exposure period EP from a time at which the pixel reset period RP1 terminates to a time at which the transmission period TP starts.

In accordance with embodiments, as the floating diffusion node FD is boosted to the boost voltage VDBS which is higher than the high voltage VDD, the source-drain voltage Vds of the NMOS transistor in the transmission block TX may rise, and the transmission capability of the transmission block TX may be improved during the transmission period TP. In addition, as the source-drain voltage Vds and the gate-source voltage Vgs of the NMOS transistor in the driver DX are increased by the boost voltage VDBS during the transmission period TP, the amount of current flowing through the driver DX may be also increased.

Consequently, in accordance with embodiments of the present invention, charge losses and image lag may decrease.

While the present invention has been illustrated and described with respect to specific embodiments, the disclosed embodiments are not intended to be restrictive.

Further, it is noted that the present invention may be achieved in various ways through substitution, change, and modification, as those skilled in the art will recognize in light of the present disclosure, without departing from the spirit and/or scope of the present disclosure.

What is claimed is:

1. An image sensing device comprising:
    a floating diffusion node;
    a reset block coupled between a supply terminal of a high voltage and the floating diffusion node, and suitable for resetting the floating diffusion node to the high voltage during a reference period based on a reset control signal;
    a photodiode coupled between a supply terminal of a low voltage and a coupling node, and suitable for generating a photocharge based on incident light during an exposure period;
    a transmission block coupled between the coupling node and the floating diffusion node, and suitable for transmitting the photocharge to the floating diffusion node during a transmission period based on a transmission control signal; and
    a selection circuit coupled between the floating diffusion node, an input terminal of a boost control signal corresponding to a boost voltage and an output terminal of a pixel signal, and suitable for generating the pixel signal with the boost voltage greater than the high voltage during the transmission period based on a selection control signal and a voltage applied to the floating diffusion node.

2. The image sensing device of claim 1, further comprising a first accumulation circuit coupled between the input terminal of the boost control signal and the floating diffusion node.

3. The image sensing device of claim 2, wherein the first accumulation circuit includes a parallel-plate capacitor.

4. The image sensing device of claim 1, wherein the selection circuit includes:
    a driver coupled between an output node and the input terminal of the boost control signal, and suitable for driving the output node to the boost voltage based on the voltage applied to the floating diffusion node; and
    an output circuit coupled between the output node and the output terminal of the pixel signal, and suitable for outputting the pixel signal based on the selection control signal.

5. The image sensing device of claim 1, wherein the selection circuit generates the pixel signal with the high voltage during the reference period.

6. The image sensing device of claim 5, wherein the selection circuit includes:
    a driver coupled between an output node and the input terminal of the boost control signal, and suitable for driving the output node to the high voltage during the reference period and driving the output node to the boost voltage during the transmission period, based on the voltage applied to the floating diffusion node; and
    an output circuit coupled between the output node and the output terminal of the pixel signal, and suitable for outputting the pixel signal based on the selection control signal.

7. The image sensing device of claim 1, further comprising a second accumulation circuit coupled between the floating diffusion node and the supply terminal of the low voltage.

8. The image sensing device of claim 7, wherein the second accumulation circuit includes a junction capacitor.

9. The image sensing device of claim 1, wherein the reset block resets the floating diffusion node to the high voltage during a pixel reset period before the reference period based on the reset control signal, and the transmission block resets the photodiode to the high voltage during the pixel reset period based on the transmission control signal.

10. An operating method of an image sensing device comprising:
   resetting a floating diffusion node by using a high voltage supplied as a source voltage;
   generating a pixel signal with the high voltage based on a voltage applied to the floating diffusion node, during a reference period;
   transmitting a photocharge generated from a photodiode to the floating diffusion node; and
   generating the pixel signal by using a boost voltage supplied as a source voltage, based on the voltage applied to the floating diffusion node, during a transmission period after the reference period, wherein the boost voltage is greater than the high voltage.

11. The operating method of claim 10, wherein the generating of the pixel signal with the boost voltage includes:
   driving an output node to the boost voltage based on the voltage applied to the floating diffusion node during the transmission period; and
   outputting a data signal corresponding to the voltage applied to the floating diffusion node as the pixel signal during the transmission period.

12. The operating method of claim 10, wherein the generating of the pixel signal with the high voltage includes:
   driving an output node to the high voltage based on the voltage applied to the floating diffusion node during the reference period; and
   outputting a reference signal corresponding to the voltage applied to the floating diffusion node as the pixel signal during the reference period.

13. An operating method of an image sensing device comprising:
   resetting a floating diffusion node by using a high voltage supplied as a source voltage;
   boosting the floating diffusion node by using a boost voltage based on a capacitive coupling effect;
   generating a pixel signal with the boost voltage based on a voltage applied to the floating diffusion node, during a reference period;
   transmitting a photocharge generated from a photodiode to the floating diffusion node; and
   generating the pixel signal by using the boost voltage, based on the voltage applied to the floating diffusion node, during a transmission period after the reference period,
   wherein the boost voltage is supplied as a source voltage, and the boost voltage is greater than the high voltage.

14. The operating method of claim 13, wherein the generating of the pixel signal during the transmission period includes:
   driving an output node by using the boost voltage based on the voltage applied to the floating diffusion node during the transmission period; and
   outputting a data signal corresponding to the voltage applied to the floating diffusion node as the pixel signal during the transmission period.

15. The operating method of claim 13, wherein the generating of the pixel signal during the reference period includes:
   driving an output node by using the boost voltage based on the voltage applied to the floating diffusion node during the reference period; and
   outputting a reference signal corresponding to the voltage applied to the floating diffusion node as the pixel signal during the reference period.

* * * * *